Oct. 7, 1941.  H. C. BOSTWICK ET AL  2,258,350
STOCK FEEDER
Filed Aug. 1, 1940  3 Sheets-Sheet 1

INVENTORS
HENRY C. BOSTWICK and
BY  EDWARD C. KASTNER
Bates, Teare, & McBean
ATTORNEY Oct. 7, 1941.　　　H. C. BOSTWICK ET AL　　　2,258,350
STOCK FEEDER
Filed Aug. 1, 1940　　　3 Sheets-Sheet 3

INVENTORS
HENRY C. BOSTWICK and
BY　EDWARD C. KASTNER
Bates, Teare, & McBean
ATTORNEYS Patented Oct. 7, 1941

2,258,350

UNITED STATES PATENT OFFICE 2,258,350

STOCK FEEDER

Henry C. Bostwick and Edward C. Kastner, Akron, Ohio, assignors to The Akron Standard Mold Company, Akron, Ohio, a corporation of Ohio Application August 1, 1940, Serial No. 349,319

8 Claims. (Cl. 154—10)

This invention relates to strip feeding apparatus for tire building machines generally, but is more particularly concerned with tire-building machines of the type adapted to build semi-flat or drum built tire carcasses.

Objects of the invention are to provide an improved stock turret for tire-building machines, which will result in increased speed in the use of such machines and thereby enable an operator to produce a greater number of tires in a given time. The machine illustrated is the type having a turret mounted upon a pedestal wherein the turret is supplied with rolls and liner strips between which stock may be stored and then selectively withdrawn for use on a tire building form.

Further objects of the invention include details of construction by means of which the material may be set in accurate registration with the drum together with mechanism for actuating or controlling the operation of the supply rolls to facilitate winding of the material thereon so as to prevent any portion thereof from hanging in an unsupported position from the roll.

A further feature of the present invention is the provision of a device which will permit the plies of material to be withdrawn under considerable tension so as to maintain the required degree of pressure in the tire carcass. The accomplishment of this object may take the form of a self-energizing brake on the supply roll which is adjustable to produce any desired degree of tension.

Figure 1:
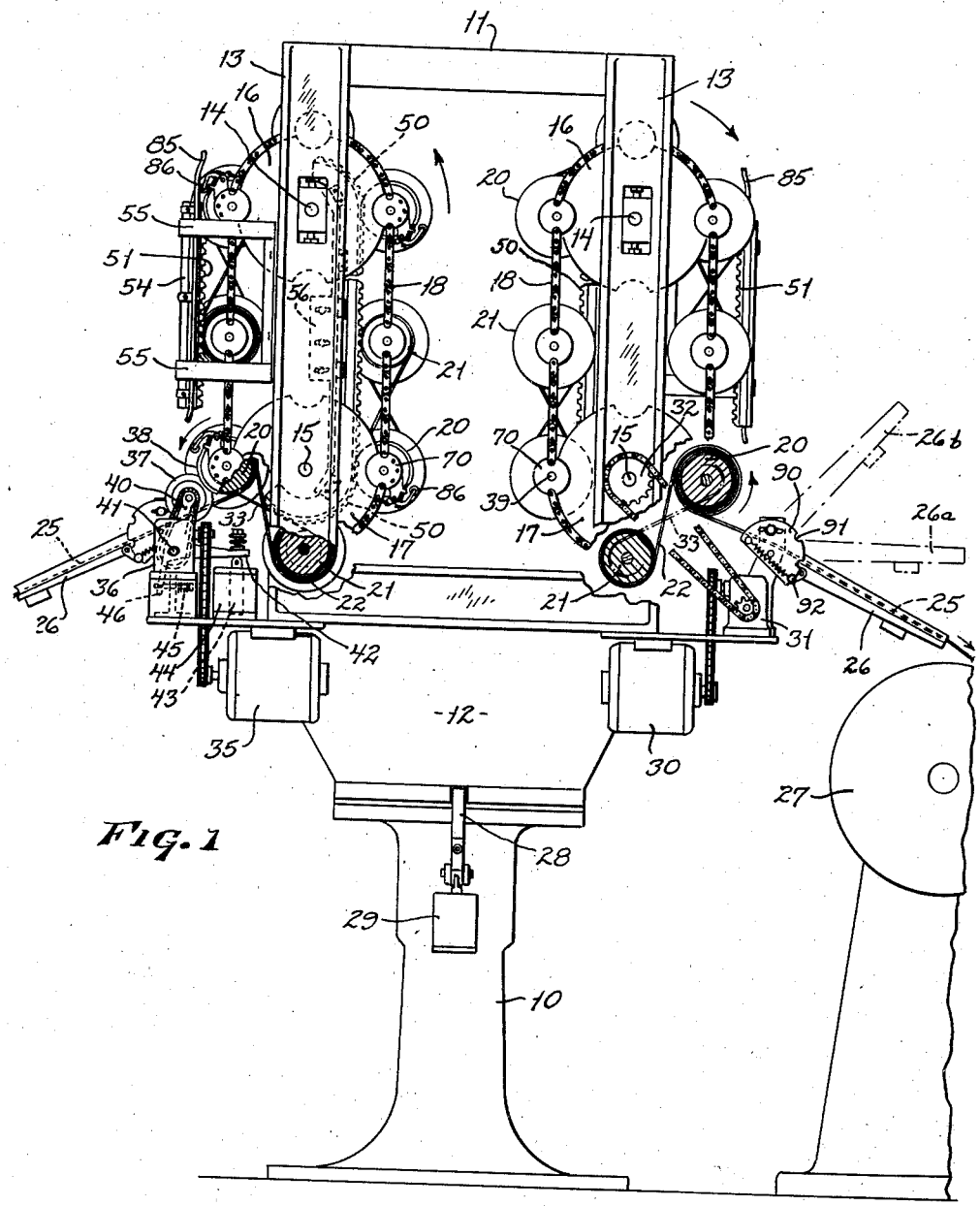
Figure 6:
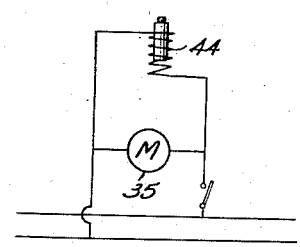
Figure 2:
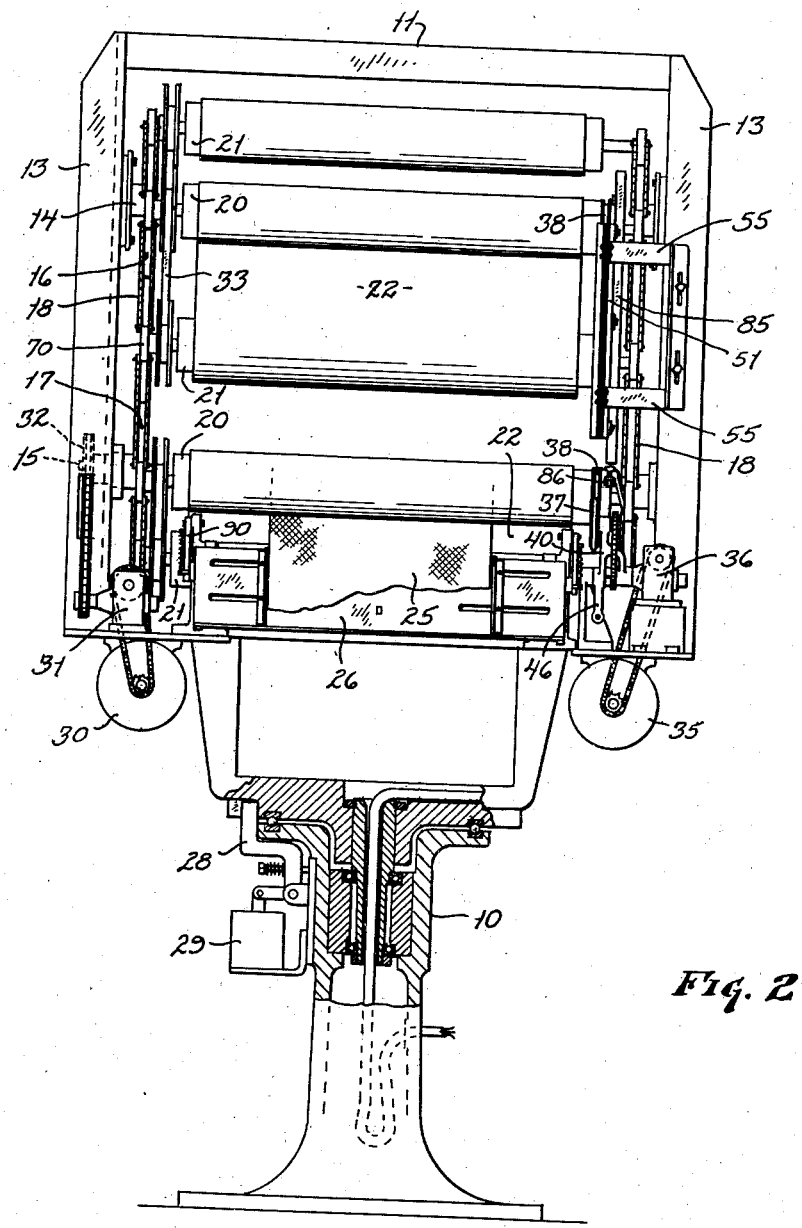
Figure 3:
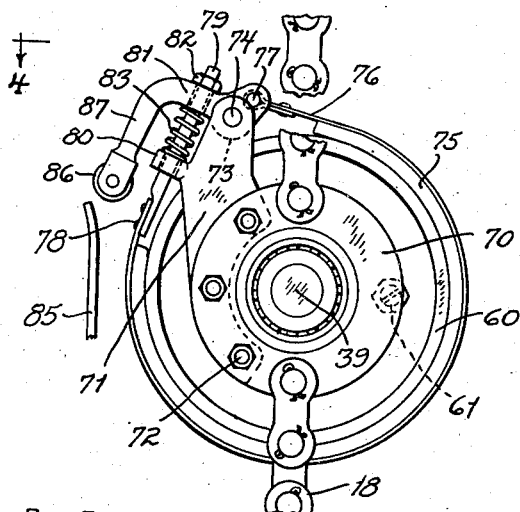
Figure 4:
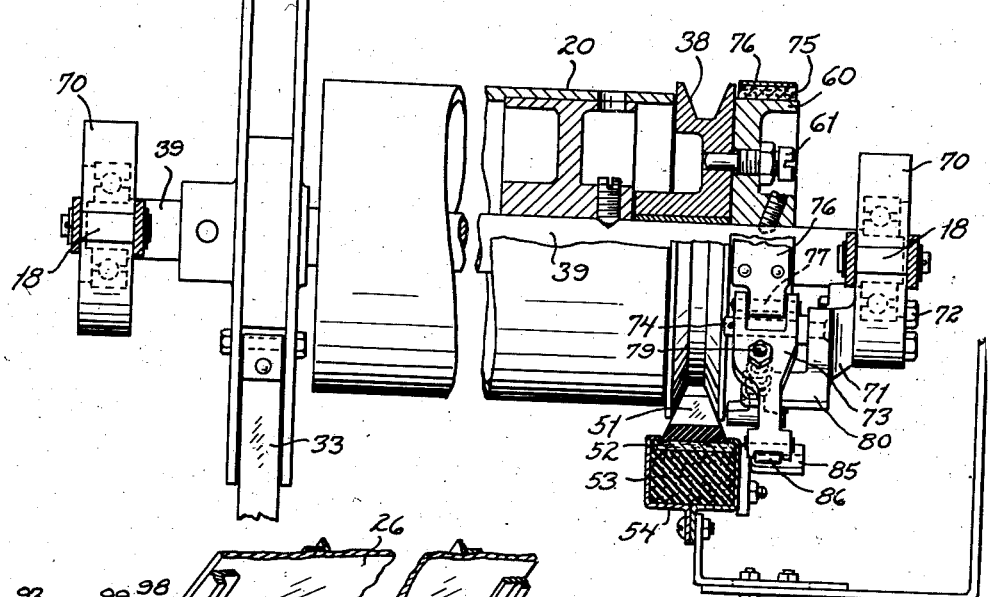
Figure 5:
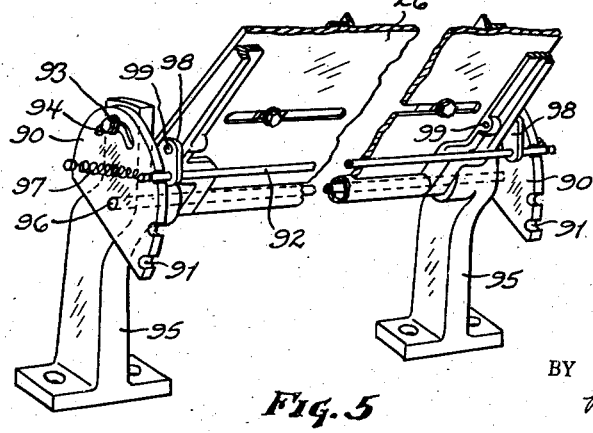

Referring now to the drawings, Fig. 1 is a side elevational view, partly broken away, of a tire building machine of the drum type including a stock turret and controls therefor, made in accordance with the present invention; Fig. 2 is an end elevation of the stock turret; Fig. 3 is a fragmentary end view of a supply roll illustrating the brake device embodying the present invention; Fig. 4 is a section taken on a plane indicated by the line 4—4 in Fig. 3, illustrating a top view of the roll and brake, partially broken away, and Fig. 5 is a perspective view showing a feeding table with mechanism for enabling it to be quickly adjusted to any desired position. Fig. 6 is a diagram illustrating the electric circuit of a motor and solenoid employed.

In the accompanying drawings, we have shown a tire building machine in which a stock storing turret or strip feeder is preferably mounted for rotation upon a support or pedestal. In the present instance a plurality of pairs of strip storing and delivery rolls are carried by the turret frame and mounted as two units for movement in an endless path, the arrangement being such that when the stock rolls positioned adjacent the discharge or unloading end of the machine are exhausted of strip stock, the turret may be rotated or indexed to present another unit of loaded or charged rolls to this unloading station, while the unit of exhausted rolls is moved to a loading or charging station where they may again be filled with strip stock.

The tire building machine shown herein preferably comprises a pedestal 10 on which a turret indicated in general at 11 is mounted. The frame may be swiveled about the base for the purpose of presenting any portion thereof to the tire building machine or to the supply station which usually is positioned on the side of the feeder opposite the tire building form. The turret frame is shown as comprising a base 12 and upright bars 13, the latter having journalled therein upper shafts 14 and lower shafts 15 upon which chain sprockets 16 and 17 are respectively fastened. Chain belts 18 then pass over the sprockets and carry a plurality of pairs of rolls, each pair consisting of a supply and a take up roll 20 and 21 respectively, with a liner 22 interconnecting the two rolls of each group, and adapted to receive a layer of material 25 which constitutes the stock that is to be used for building a tire. The arrangement is such that while stock is being withdrawn from the supply rolls at one side of the machine across a feed table 26 and onto a tire building form or drum 27, the rolls on the opposite side are presented to a supply station where the exhausted rolls may be replenished with new material. A latch 28 on the standard 10, adapted to enter suitable notches in the turret base 12, and releasable by means of a solenoid 29, may be provided to register the turret and maintain it in a selected position.

Each group of supply roll pairs is adapted to be actuated, preferably by causing the chain belt to move, whenever desired. This may be accomplished by means of an electric motor 30 which is suitably connected as by a gear reduction unit 31 to a chain belt drive which operates the sprocket 32 on the lowermost shaft 15 of the right hand unit. It is to be understood, moreover, that the same construction is to be used on the opposite side of the turret for operating the shaft 15 of the left hand unit. A suitable circuit controller in the form of a push button (not shown) may be positioned at a location convenient to the operator for controlling the operation of the motor whenever desired.

During the winding operation, that is to say, during the time that the material is supplied to the rolls, the particular supply roll to which the material is fed is adapted to be rotated by means of an electric motor 35 which is suitably connected through a gear reduction unit, indicated in general at 36, to a driving wheel 37. This wheel may have a rubber covered face for engagement with a grooved pulley wheel 38 loose on a shaft 39, on which the supply roll 20 is carried, but is normally drivingly connected to it, as hereinafter explained. Thus, in the position of the machine as illustrated in Fig. 1, the supply roll immediately adjacent the feed table 26 (left hand side of Fig. 1) is in position for operation by the motor 35 whenever desired. This is accomplished by closing a circuit through the motor by means of a push button controller (not shown), which is located in any convenient position adjacent the operator on the supply side of the machine.

Normally, the driving wheel 37 is out of contact with the pulley wheel 38, that is, when the current through the motor 35 is disconnected, but whenever the current is supplied to the motor a mechanism is actuated for moving the driving wheel 37 into contact with the pulley wheel 38. This may be accomplished by mounting the shaft for the driving wheel 37 upon a bellcrank 40 which may be pivoted at 41 for rocking the driving wheel toward and from the driven pulley 38. One form of mechanism for accomplishing this purpose is shown as an arm 42 of the bellcrank which is connected to the armature 43 of a solenoid 44. The wheel 37 is normally held away from the position of driving engagement by means of a spring 45, operating on a projection 46 of the bellcrank, but is forced into such engagement whenever the solenoid is actuated. By connecting the solenoid in circuit with the motor 35 (as indicated in Fig. 6), the driving wheel is moved into engagement with the driven pulley whenever the motor is actuated.

During the winding of the material onto the supply roll, the strip is interwound between adjacent convolutions of the liner, because the liner is being unwound from the take up roll to the supply roll in the customary way. During the withdrawal of the material, and, hence, the unwinding of the liner from the supply roll, the liner is returned to the take up roll, the latter being rotated by a coil spring 33 in the usual manner.

Whenever a supply roll has been replenished, then the strip is cut off on the feed table 26, thereby leaving an exposed end. Thereupon, the motor 30 is actuated to move the next pair of supply and take up rolls to the feeding station. During such movement, provision is made for automatically winding up the exposed tail of the supply strip, by causing the supply roll to rotate on its own axis, while the chain is moving with respect to the frame. This may be performed by means of a curved trackway 50, which is adapted to be engaged by the pulley wheel 38, and, hence, the supply roll is rotated in the direction required for winding up the strip. The curved track is extended upwardly along the back reach of the chain belt, as shown in Fig. 1, and additionally, the track is shown as having rack teeth therein for effecting firm engagement with the grooved portion of the pulley wheel. The track 50 preferably has the same construction as a track 51 which is positioned adjacent the outer reach of the chain belts, and the purpose for which will be set forth later. The track 51 is shown in cross section in Fig. 4, as having a facing or teeth of flexible material, such as rubber, which may be attached to a backing strip 52, and this in turn is backed up by a strip of material 53, such as sponge rubber, that is held within a casing 54. The net results of this construction is that the yieldability of the track assures firm engagement with the driven pulley to effect satisfactory rotation of the supply roll during the movement of the chain belts. The casing 54 is shown as being supported by means of brackets 55 which extend outwardly from the frame member 13. Likewise, the track 50 is supported by means of brackets indicated at 56 which are attached to the frame member 12. It is to be understood that the same construction is to be used on the two endless chain units, that is, that the turret is symmetrical about its axis.

The function of the track 51 is to cause an unwinding movement of the supply roll by a predetermined amount while the rolls are moving downwardly on the outer reach of the chain belt so as to expose a sufficient amount of the supply strip for grasping by an operator standing in front of the tire forming machine 27. The length of the track 51 may be predetermined to provide the desired degree of unwinding. By locating the trackway moreover, in such position that the supply rolls are unwound while they are moving down the outer reach of the chain belt, the partial unwinding occurs automatically upon each supply roll in turn.

In the event that a tire is to be formed with a less number of plies than groups of supply and take up rolls for which any particular machine is designed, then provision is made for disconnecting these groups of unused supply and take up rolls so as to avoid breaking of the liner strip or undue wear on the trackways, as a result of the automatic rotation of the rolls resulting from contact between the tracks 50 and the pulley wheel 38, without the accompanying reversal of rotation due to withdrawal of stock at the tire building station. This may be accomplished by providing a detachable connection between the pulley wheel 38 and its respective supply roll. This may be seen, for example, in Fig. 4, wherein a brake drum 60, which is rigid with the shaft 39, and thereby with the roll 20, is detachably connected to the pulley wheel 38 by means of a removable stud 61.

To supply the desired degree of tension on the material which is being withdrawn from the supply roll and led onto the tire building form, we may provide a brake which acts on each supply roll. In the form shown, the brake is mounted upon a bearing block 70 which is carried by the chain and which supports the bearing for the shaft 39. The block may carry a bracket 71 which is fastened thereto as by bolts 72, while a bellcrank 73 is shown as being pivoted at 74 upon the bracket. A brake band 75, which bears upon the periphery of the brake drum 60 may be attached to a flexible strip 76, one end of which is secured, as at 77, to the shorter arm of the bellcrank 73, while the opposite end is secured, as at 78, to a threaded pin 79.

To make the brake self-energizing, the pin 79 may slide in a hollow boss 80 upon the bracket 71, and may project through an opening in the longer arm 81 of the bellcrank. A nut 82, threaded upon the pin bears against the face of the arm, while a compression spring 83 may be interposed between the boss 80 and the arm 81. The arrangement is such that the brake band is tensioned upon the drum, because the spring 83 tends to rock the longer arm upwardly, as seen in Fig. 3, and to rock the shorter arm downwardly. Thus, there is more tendency to take up on the brake band at the point 78 than there is to relieve it at the point 77. The net result of which is to provide a one way brake upon the supply roll. During the wind-up operation, that is, when the stock is being fed onto the supply roll, the rotation of the supply roll is in a counter-clockwise direction as viewed in Fig. 1, and also in Fig. 3, which tends to rock the bellcrank 73 counter-clockwise, and thereby to relieve the tension of the brake band. During the withdrawal of the stock at the discharge station, however, the rotation of the roll is clockwise, wherefor, the brake band binds upon the drum, the extent of the binding being adjustable by means of the nut 82. The advantage of this arrangement is that the brake is in effect released while the supply rolls are moving upwardly on the inner reach of the chain, and being rotated by the track 50, and also while the motor 35 is rotating the rolls. Additionally, the brake is intended to be released while the rolls are moving downwardly on the outer reach of the chains and being rotated in the reverse direction by the track 51. This may be accomplished by means of a track 85 which is shown as being carried by the casing 54. This track terminates above the point at which the supply roll is operated to receive a strip of material, and also terminates on the discharge side above the point where the material is withdrawn from the rolls and fed onto the tire building form. The function of the track is to engage a roller 86 on an arm 87 which may be integral with the longer arm of the bellcrank 73. The track moves the roller and the associated arm inwardly toward the drum, thereby releasing the band therefrom. Thus, the brake is automatically self-energized to resist rotation whenever the material is being pulled by hand therefrom during the tire forming operation, but is automatically released whenever resistance to rotation would be undesirable.

To facilitate registration between the discharge table 26, and the tire building form regardless of the size of the form (within the range of the equipment), the table is provided with mechanism by means of which it may be quickly moved out of the way of the tire building form and then subsequently dropped quickly into proper operating position. Such mechanism, insofar as the supports for the table is concerned, may embody a circular segmental plate 90 which is provided with notches 91 at spaced points on its periphery into which a pin 92, movably mounted on the table is adapted selectively to engage. As shown in Fig. 1, the table 26 is illustrated in full line as being in position most conveniently adapted for transferring material from the supply roll onto the form. Other positions of the table are indicated by the broken lines 26a and 26b, the position 26a being suitable for use with a drum larger than that shown in Fig. 1, or for the application of an aligning device (not shown), and the position 26b being suitable for movement to clear the drum for removal of the tire carcass.

Whenever the form is utilized for production of numerous tires of a given size, the position of the plate 90 may be affixed with reference to the frame. When, however, the form is changed, to facilitate readjustment of the table, we provide a mechanism for adjusting the plate with reference to the frame, and then locking it in the adjusted position. This may take the form of a bolt and slot connection, the bolt being designated 93 and the slot 94 (Fig. 5), between the plate 90 and a bracket 95 which forms a support for the shaft 96 on which the plate is adapted to rotate. This shaft also provides a pivotal support for the table 26. In practice then, the plate is adjusted until the table, when in discharging position, is best suited to the requirements of the operator. Thereafter, the connection 93, 94 is locked against movement until a change in the drum size is desired.

To hold the table in any adjusted position with respect to the plate, we have shown a yieldable connection in the form of a spring 97 which acts upon the pin 92 in a direction to pull it towards the notch 91. The pin in turn may be carried by arms 98 which are pivotally mounted, as at 99, on the side members of the table. A plate 90, just described, is provided at either side of the table, and engageable by the two end portions of the pin.

From the foregoing description, it will be apparent that we have provided improved means for increasing the efficiency of operation of a stock feeder by facilitating the insertion and withdrawal of the material and by controlling the tension at which the material may be withdrawn from the rolls. Other details of construction heretofore set forth and illustrated in the drawings likewise aid the operator in performing the task of building a tire by reducing the time required for manipulating the rolls and adjusting the table to suit the form that is being used.

We claim:

1. In a tire building machine, the combination of a frame, a strip supply unit mounted upon the frame and including a plurality of pairs of storing rolls, and means acting upon the rolls consequent upon the shifting thereof for rotating them, said last named means including a track carried by the frame, and a pulley wheel carried by the roll and adapted to engage the track, said track including a pulley engaging portion and a resilient backing strip therefor.

2. In a tire building machine, the combination of a frame, a strip supply unit mounted upon the frame and including a plurality of pairs of strip storing rolls, means to rotate one of the storing rolls for winding material thereon, and means acting upon the roll consequent upon the shifting thereof toward a discharge station to partially unwind it so as to present a portion of the material for withdrawal at the discharge station.

3. In a tire building machine, the combination of a frame, a strip supply unit mounted upon the frame and including a plurality of pairs of strip storing rolls, means to rotate one of the storing rolls for winding material thereon, and means acting upon the roll consequent upon the shifting thereof toward a discharge station to partially unwind it so as to present a portion of the material for withdrawal at the discharge station, said last named means including a track having a pulley engaging portion and a resilient backing strip therefor carried by the frame, and a pulley wheel carried by the roll and adapted to engage the track.

4. In a tire building machine, the combination of a frame, a strip supply unit mounted upon the frame and including a plurality of pairs of strip storing rolls, means on each pair of rolls to rotate them consequent upon the shifting thereof to wind a strip of stock material thereon, and a releasable connection between said means and the rolls whereby some of the rolls may be selectively disengaged from said means.

5. In a tire building machine, the combination of a frame, a stock storing unit mounted on the frame and including a plurality of storing rolls and bearing blocks therefor, and one-way brake means carried by one of the blocks and acting on a brake drum carried by the associated roll, said means including a bellcrank pivoted to the block and having arms of unequal length and a brake band secured at its ends to the respective arms of the bellcrank.

6. In a tire building machine, the combination of a frame, a stock storing unit mounted on the frame and including a plurality of stock storing rolls adapted to travel in an endless path upon the frame, brake means acting upon one of the rolls to resist its rotation in stock unwinding direction, means acting upon the roll during a portion of its travel to rotate it in stock unwinding direction, and means to release the brake during said portion of its travel, said last named means including a track on the frame adapted to be engaged by a portion of the brake means.

7. In a tire building machine, the combination of a frame, a strip supply unit mounted on the frame and including a plurality of pairs of storing rolls, means carried by the frame to rotate one of the storing rolls for feeding material thereto, said means comprising a driving wheel mounted for movement towards and from the last mentioned storing roll, a motor for operating the driving wheel, a solenoid in circuit with the motor for common control, and a solenoid actuated means opposed by yieldable means for holding the wheel in or out of driving engagement with the supply roll.

8. In a tire building machine, the combination of a frame, a strip supply unit mounted on the frame and including a plurality of pairs of storing rolls, means carried by the frame to rotate one of the storing rolls for feeding material thereto, said means comprising a driving wheel mounted for movement towards and from the last mentioned storing roll, and an electric motor mounted on the frame to rotate the driving wheel, yieldable means for normally holding the driving wheel out of engagement with said storing roll, and a solenoid actuated means for holding the wheel in driving engagement with said storing roll, said solenoid being in circuit with said motor whereby the driving wheel is held in engagement with said storing roll whenever the circuit to the motor is closed.

HENRY C. BOSTWICK.
EDWARD C. KASTNER.